United States Patent [19]

Tsuji

[11] Patent Number: 4,673,262

[45] Date of Patent: Jun. 16, 1987

[54] COMPACT FINDER

[75] Inventor: Sadahiko Tsuji, Kanagawa, Japan

[73] Assignee: Canon Kabushiki Kaisha, Tokyo, Japan

[21] Appl. No.: 677,916

[22] Filed: Dec. 4, 1984

[30] Foreign Application Priority Data

Dec. 5, 1983 [JP] Japan .......................... 58-187892[U]

[51] Int. Cl.⁴ ...................... G02B 23/04; G02B 25/00; G02B 27/16; G02B 17/08
[52] U.S. Cl. .................................... 350/538; 350/540; 350/410; 350/445; 354/225
[58] Field of Search .............. 350/538, 540, 561, 562, 350/572, 410, 445, 171, 170, 169; 354/225

[56] References Cited

U.S. PATENT DOCUMENTS 2,219,314 10/1940 Hoch .................................. 350/540
3,464,764 9/1969 Scidmore et al. .................. 350/445
4,437,750 3/1984 Ikari .................................. 354/225
4,526,444 7/1985 Fantone et al. .................... 350/540

FOREIGN PATENT DOCUMENTS 2926973 1/1981 Fed. Rep. of Germany ...... 350/540

Primary Examiner—Jon W. Henry
Attorney, Agent, or Firm—Toren, McGeady & Associates

[57] ABSTRACT

The disclosed finder includes an optical system having an optical axis and an image plane, an eyepiece lens conjugately arranged at the rear to observe the image plane, a plurality of lens units, and a reflecting mirror arranged between the successive two of the lens units, to obtain an erect image and to shorten the total finder length.

7 Claims, 9 Drawing Figures

F I G. 4
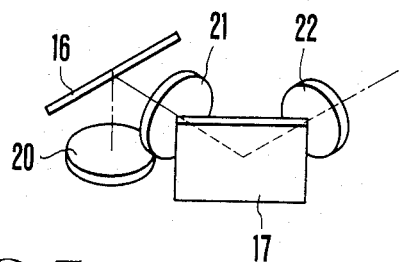
F I G. 5
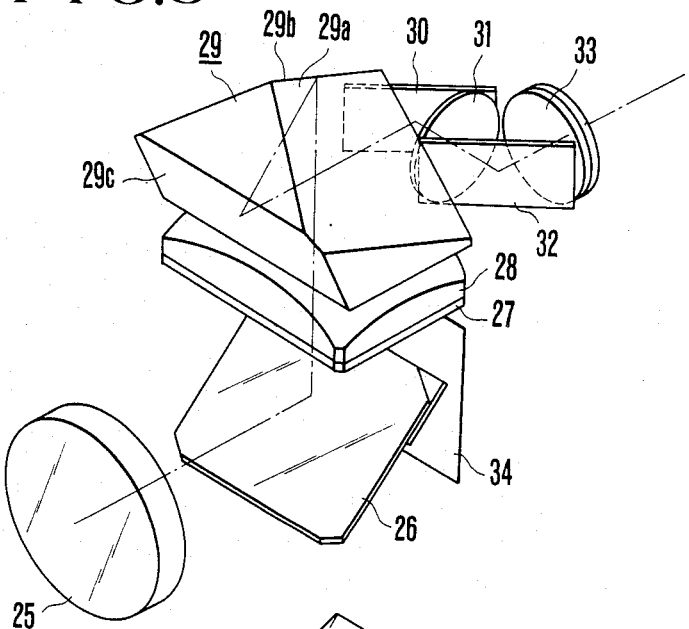
F I G. 6
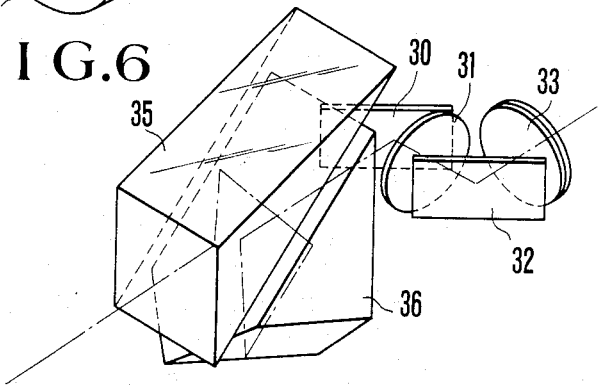

COMPACT FINDER

BACKGROUND OF THE INVENTION

1. Field of the Invention:

This invention relates to eyepiece lenses and more particularly to eyepiece lenses suited for reducing the size of the finder.

2. Description of the Prior Art:

Three examples of the known two-component type eyepiece lens are depicted in FIGS. 1A to 1C. In general, eyepiece lenses of low magnifying power are constructed with one singlet and one cemented doublet. High performance eyepiece lenses of high magnifying power or high eyepoint distance, in which it is difficult to space the eye point away from the lens surface area are shown in FIGS. 1A to 1C. Such lenses are usually constructed with at least two components of different refractive power arrangement depending on the purpose. Generally, as shown in FIG. 1A, the two components are, from front to rear, a lens 1 of positive power and a cemented lens 2 of positive power. When high magnifying power is needed, the construction and arrangement of the two components is varied, as shown in FIG. 1B, to include a cemented lens 3 of positive power and a lens 4 of negative power. When a large eyepoint distance is wanted, the construction is reversed as shown in FIG. 1C, to include a lens 5 of negative power and a cemented lens 6 of positive power.

To employ such eyepiece lenses for observing the image of an object formed in optical instruments such as cameras, the finder image preferably looks erect vertically and horizontally. Cameras in which light from the photographic lens is directed to the finder by a quick return mirror or a beam splitter such as a half-prism, including the so-called single lens reflex cameras, require an erecting optical system. Erecting optical systems include secondary imaging types using an erecting lens, and primary imaging types using a prism system and a mirror system, for example, a pentagonal roof prism, a Pechen prism, a porro-prism, or a porro-mirror. The pentagonal roof prism and Pechen prism, because they employ roof type reflection surfaces, tend to be expensive. In this respect, the use of a porro-prism or porro-mirror is advantageous. However, when the porror-mirror system is used, it is necessary to use at least four reflection surfaces in the optical path of the finder, and the length of the optical path thus has to be increased. Therefore, the use of the prior eyepiece lens in such finder optical systems results in the addition of the physical length of the eyepiece lens to the length of the optical path of the finder. This produces a disadvantageous increase in the bulk and size of the complete finder. Moreover, because the eyepiece lens is necessarily of increased focal length, its magnifying power is difficult to increase.

SUMMARY OF THE INVENTION

A first object of the present invention is to provide an eyepiece lens system for assisting in minimizing the size of the finder.

A second object of the present invention is to provide an eyepiece lens system for assisting in increasing the magnifying power of the finder.

A third object of the present invention is to provide a finder of reduced size with high magnifying power.

A fourth object of the present invention is to provide an eyepiece lens constructed with at least two lens units, whereby a reflection member is arranged in a space between the successive two of the lens units so that the optical path is bent by the reflection surface to obtain a vertically and horizontally erect image to be observed.

BRIEF DESCRIPTION OF THE DRAWINGS

FIG. 4 is a fragmentary perspective view illustrating another embodiment of the invention.

FIG. 5 is a perspective view illustrating still another embodiment of the invention.

FIG. 6 is a perspective view illustrating a further embodiment of the invention.

DETAILED DESCRIPTION OF THE PREFERRED EMBODIMENTS

The present invention will next be described in detail in connection with illustrated embodiments thereof.

Figure 1A:
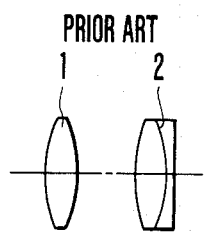
FIGS. 1A to 1C are longitudinal section views of the prior known eyepiece lenses respectively.
Figure 1B:
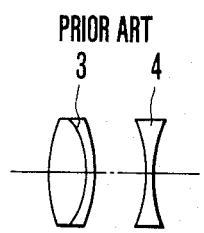
Figure 1C:
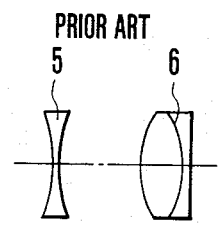
Figure 2:
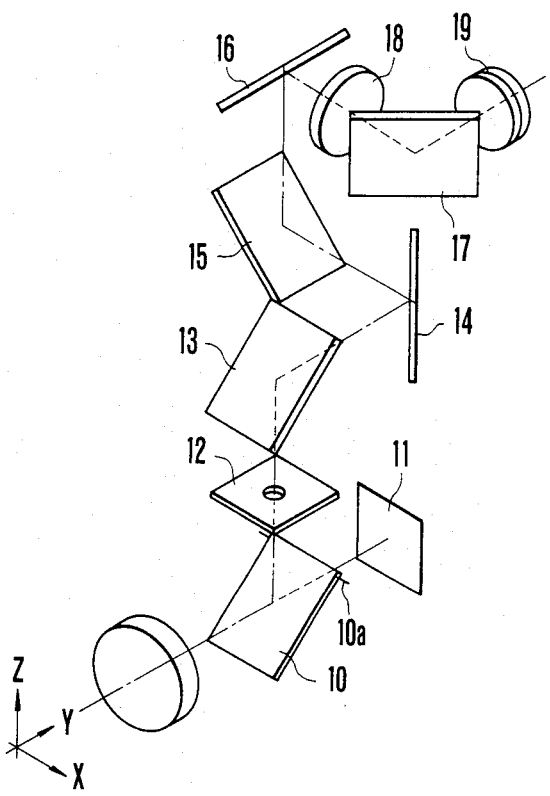
FIG. 2 is a perspective view illustrating a first embodiment of the invention.

FIG. 2 illustrates an example of application of the eyepiece lens of the invention to the finder optical system for a camera in which a porro-mirror system is used to observe an erect image. A movable mirror 10 is arranged between a photographic lens (not shown) and an image pickup device 11 (or film plane) in the camera. Upon setting in the illustrated or viewing position, movable mirror 10 totally reflects light from the photographic lens to a focusing screen 12 positioned in conjugate relation to the image pickup plane 11. Upon start of a photographic operation of the camera, movable mirror 10 turns about a pivot shaft 10a in a clockwise direction to the nonviewing position where an object image is formed on the image pickup plane 11. This mirror 10 may be replaced by a semi-transparent mirror, or a half-prism, and in this case the reflected light goes to the focusing screen 12, and the transmitted light arrives at the image pickup plane 11. Five totally reflecting mirrors 13 to 17 are arranged fixedly and oriented as shown in the drawing so that light from the focusing screen 12 is successively reflected. Two lens units 18 and 19 constitute an eyepiece lens of such type as shown in FIG. 1 with the mirror 17 in the air space between the lens units 18 and 19. That is, this eyepiece lens is of the mirror-intervening two-component type. The parallel mirrors 10 and 13 translate light from the photographic lens and then the mirrors 14 to 17, constituting a porro-mirror system known to those skilled in the art, enable observation of a vertically and horizontally erect image of the object.

In this embodiment, considering a system of XYZ coordinates with Y-axis in parallel to the optical axis of the photographic lens, light from the photographic lens is reflected by the successive mirrors 10 to 17 as described below. The reflected light to Z-axis direction by the mirror 10 after having passed through the focusing screen 12 is reflected to Y-axis direction by the mirror 13. After that, it is reflected to -X-axis direction by the mirror 14, then to Z-axis direction by the mirror 15, then to X-axis direction by the mirror 16 and then to Y-axis direction by the mirror 17, thus being directed to an observing position. It is to be noted that, in this embodiment, the light from the mirror 16 passes through the lens unit 18 to the mirror 17 and therefrom reflected to pass through the lens unit 19.

Figure 3A:
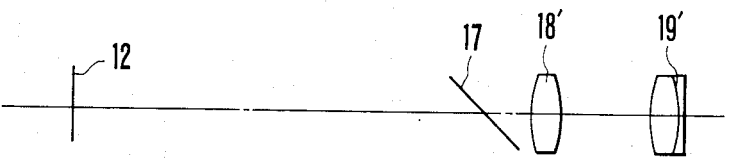
FIG. 3A is an axially expanded sectional view of the basic part of a finder system.
Figure 3B:
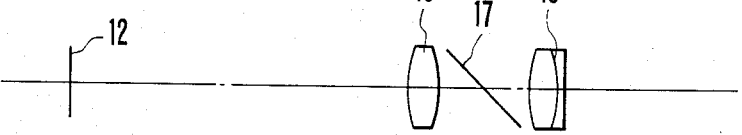
FIG. 3B is similar to FIG. 3A and shows the effect of the invention.

FIGS. 3A and 3B illustrate respectively the finder optical systems employing the prior known arrangement of the eyepiece lens depicted in one of FIGS. 1A to 1C and the arrangement of the invention as expanded along the optical axis. In these drawings, 12 is the aforesaid focusing screen; 17 is the aforesaid mirror; 18 and 19, or 18' and 19' correspond to the respective lens units constituting the eyepiece lens. As is obvious from the comparison of the prior art shown in FIG. 3A and the invention shown in FIG. 3B, the distance between the focusing screen and the rear vertex of the eyepiece lens is remarkably reduced. Thus, an improvement of the compactness of the finder is achieved. Another advantage arising from the reduction of the above-identified distance is that the focal length of the eyepiece lens can be shortened with an increase in the image magnification.

FIG. 4 illustrates another embodiment of the invention where the number of lens units constituting the eyepiece lens is increased to three. As a result, the eyepiece lens of three lens units 20, 21 and 22 is included with the aforesaid mirror 16 between the lens units 20 and 21 and the aforesaid mirror 17 between the lens units 21 and 22. In this embodiment, too, both reduction in the size and the increase in the image magnification become possible at a time when a proper refractive power arrangement of the lens units 20, 21 and 22 is chosen.

FIG. 5 illustrates another embodiment of the invention applied to the finder having the penta roof type prism. The finder further includes a quick return mirror 26 behind a photographic lens 25, a focusing screen 27, and a condenser lens 28. The penta roof type prism 29 has roof reflection surfaces 29a and 29b, and a front reflection surface 29c. A first optical path bending mirror 30 and a second optical path bending mirror 32 are arranged with a front lens unit 31 therebetween. The second optical path bending mirror 32 is followed by a rear lens unit 33 constituting an eyepiece lens together with the front lens unit 31. Element 34 denotes a photographic film plane or the light receiving surface of a video imaging element.

Light emerging from the photogrpahic lens 25 is reflected upward by the quick return mirror 26 to the focusing screen 27 on which an image of an object is formed. Light from the focusing screen 27 passes through the condenser lens 28 and enters the penta roof type prism 29. Within the prism, the light is reflected from the roof surfaces 29a and 29b to the front reflection surface 29c and therefrom reflected to the exit surface thereof. The light from the exit surface goes to the first optical path bending mirror 30, and therefrom to the front lens unit 31 of the eyepiece lens, the second optical path bending mirror 32 and the rear lens unit 33 successively, finally reaching an eye of the observer.

FIG. 6 illustrates another embodiment of the invention applied to the finder using a Pechen's prism comprised of prism blocks 35 and 36. First and second optical path bending mirrors 30 and 32 and front and rear lens units 31 and 33 of an eyepiece lens are similar in construction and arrangement to those shown in FIG. 5. Within the Pechen's prism, as light first enters the first block 35, it is reflected from the bottom and upper surfaces successively to the second block 36. Within the second block 36, the light is reflected first from the rear surface, then from the lower or roof surfaces, and then from the front inclined surface to the rear surface, for this time, passing therethrough to the eyepiece lens.

The eyepiece lens of the invention is applicable even to other finders than those described above provided reflection mirrors are used adjacent the eyepiece lens.

As has been described in greater detail above, according to the present invention, a great improvement of compactness and a valuable increase of the magnification power of the finder optical system can be simultaneously achieved by an eyepiece lens of very simple form.

What is claimed is:

1. An eyepiece lens system for observing an image of an object comprising:
    an eyepiece lens including a plurality of lens units and having a frontmost surface and a rearmost surface;
    reflecting means having reflection surfaces to reflect light which passes a preceding one of said lens units to a next one of said lens unit; and
    a distance from the image of the object to the frontmost surface of the eyepiece lens along the optical axis being greater than a length of the frontmost surface to the rearmost surface of the eyepiece lens.

2. A system according to claim 1, wherein said eyepiece lens is composed of two lenses.

3. A device according to claim 1, wherein said lens units being three in number, and said reflecting means including a reflection surface arranged between each successive two of said lens units.

4. An eyepiece lens system comprising:
    an eyepiece lens including a plurality of lens units;
    reflecting means having reflection surfaces to reflect light which passes a preceding one of said lens units to a next one of said lens unit; and
    said lens units being three in number, and said reflecting means including a reflection surface arranged between each successive two of said lens units.

5. A photographic system comprising:
    (a) a photographic lens having an optical path;
    (b) image receiving means for receiving an image formed by said photographic lens;
    (c) an optical splitter between said photographic lens and said image receiving means to split off the optical path;
    (d) four reflection surfaces arranged along the split-off optical path successively;
    (e) a focusing screen arranged on the split-off optical path;
    (f) an eyepiece lens including a plurality of lens units for observing the image formed by said photographic lens and having a frontmost surface and a rearmost surface;
    (g) another reflection surface arranged between said lens units; and
    (h) a distance from said focusing screen to the frontmost surface of the eyepiece lens as measured along the optical axis being longer than the length from the frontmost surface to the rearmost surface of the eyepiece lens.

6. A photographic system according to claim 5, wherein said lens units are three in number, and first of said lens units lies on the optical splitter side of the last of said four reflection surfaces.

7. A photographic system as in claim 5, wherein said reflection surfaces reflect light successively in three mutually perpendicular directions.

* * * * *